United States Patent [19]
Cutchis

[11] Patent Number: 5,969,504
[45] Date of Patent: Oct. 19, 1999

[54] AUTOMATIC BATTERY POWER SWITCH

[75] Inventor: Protagoras N. Cutchis, Highland, Md.

[73] Assignee: The Johns Hopkins University, Baltimore, Md.

[21] Appl. No.: 09/035,278

[22] Filed: Mar. 6, 1998

[51] Int. Cl.$^6$ ................................................. H02J 7/00
[52] U.S. Cl. ............................................................. 320/121
[58] Field of Search .................................... 320/121, 135, 320/120; 429/61, 90

[56] References Cited

U.S. PATENT DOCUMENTS

| | | |
|---|---|---|
| 290,468 | 12/1883 | Perkins . |
| 435,545 | 9/1890 | Prescott, Jr. . |
| 446,666 | 2/1891 | Edison . |
| 844,090 | 2/1907 | Bijur . |
| 996,960 | 7/1911 | Andersen . |
| 1,182,241 | 5/1916 | Bendel . |
| 2,033,070 | 3/1936 | Hanley . |
| 2,353,410 | 7/1944 | Marshall et al. . |
| 3,686,530 | 8/1972 | Bogut ........................................ 320/121 |
| 3,975,670 | 8/1976 | McDermott ................................. 320/13 |
| 4,698,578 | 10/1987 | Mullersman et al. ................... 320/112 |
| 4,857,822 | 8/1989 | Tabisz et al. ............................ 323/282 |
| 4,961,151 | 10/1990 | Early et al. .............................. 364/492 |
| 4,962,462 | 10/1990 | Fekete ...................................... 364/492 |
| 5,153,496 | 10/1992 | LaForge ..................................... 320/17 |
| 5,258,244 | 11/1993 | Hall et al. ................................. 429/61 |
| 5,422,558 | 6/1995 | Stewart ....................................... 320/7 |

*Primary Examiner*—Peter S. Wong
*Assistant Examiner*—Lawrence Luk
*Attorney, Agent, or Firm*—Carla Magda Krivak

[57] ABSTRACT

An automatic battery power switch circuit which switches from n to n+m cells, where n and m are integers, in a battery. The circuit delivers a relatively constant voltage over a wide range of load current conditions. One embodiment switches based on load current. Another embodiment switches based on the output voltage of the circuit. The circuit provides a high speed automatic switch used in devices that require at least two power states, that can function as a voltage regulator, and that can significantly prolong functional battery life.

6 Claims, 5 Drawing Sheets

AUTOMATIC BATTERY POWER SWITCH

STATEMENT OF GOVERNMENTAL INTEREST

The Government has rights in this invention pursuant to Contract No. FA8002-96-C-0301 awarded by the United States Air Force.

BACKGROUND OF THE INVENTION

1. Field of the Invention

The present invention is directed to an automatic battery switch which can be used in devices that require at least two power states. More particularly, the present invention is a device that switches from n to n+m cells, can function as a voltage regulator and can significantly prolong functional battery life.

2. Discussion of the Related Art

Many battery powered devices, such as cellular telephones, etc., draw varying amounts of power depending on their immediate function. For example, a cell phone monitoring for an incoming call powers only the receiver and draws a small amount of current. When it is transmitting during a call, a considerably larger current is needed to power the transmitter. Thus, if a cell phone requires a minimum power supply (battery voltage) of 7.0 V to work and six NiCd cells (1.2 V each) are used, the total voltage will be 7.2 V. However, under high current load, the voltage will sag to a lower level and the cell phone may cease to work. If eight cells are used, the low current voltage will be 8×1.2 V, which is 9.6 V, which may be too much voltage for some of the circuitry.

A typical solution to this problem, is to add a voltage regulator. However, this solution can have many drawbacks. For example, if the electronic device has a very low standby current of 2–3 $\mu A$ (i.e., to keep a memory alive), the regulator's additional 8–9 $\mu A$ adds significantly to the quiescent power consumption (8–9 $\mu A$ is about as low a quiescent power consumption as any commercially available linear regulator attains). Further, the linear regulator has a "drop-out" voltage, which is defined as the difference between the input and output voltages. This is typically 1.0–1.2 V for most current loads. For some batteries that have flat discharge curves (such as the $LiMnO_2$ battery), this additional 1.2 V reduces the useful battery life by as much as 50%. As previously mentioned, if the cell phone or other electronic device requires a minimum of 7.0 V to work, the battery must now produce 7.0+1.2=8.2 V. Some batteries still retain half of their overall capacity at this new voltage cutoff point.

Thus, there is a need to provide a high speed automatic switch circuit which can switch between at least two power states and functions as a voltage regulator.

SUMMARY OF INVENTION

It is an object of the present invention to provide a high speed automatic battery power switch for switching between at least two power states.

It is another object of the present invention to provide an automatic battery power switch for switching from n cells to n+m cells in a battery.

It is a further object of the present invention to provide an automatic battery power switch which can replace a voltage regulator or act as a pre-regulator.

It is yet another object of the present invention to provide an automatic battery power switch which significantly prolongs functional battery life.

It is yet a further object of the present invention to provide an automatic battery power switch in which the total quiescent current is merely the leakage through the capacitors.

It is still another object of the present invention to provide an automatic battery power switch in which the drop-out voltage is very low.

The present invention is obtained by providing an automatic battery power switch circuit, including n+m cells in a battery, an inductor for determining the current level at which switching occurs, a first capacitor having a first end connected between a first end of the inductor and a second end connected to ground, a second capacitor having a first end connected between a second end of the inductor and a second end connected to ground, and a switch for switching between n and n+m cells based on a change in current.

Another embodiment of the present invention includes an automatic battery power switch circuit including n+m cells in a battery, a diode connected between n+m and said n cells and an output of the circuit, a voltage divider for determining a switching voltage threshold level, a comparator comparing the voltage from the voltage divider with a predetermined voltage and providing an output, and a switch for switching between n and n+m cells based on the output from the comparator.

These objects, together with other objects and advantages which will be subsequently apparent, reside in the details of construction and operation as more fully described and claimed hereinafter, reference being had to the accompanying drawings forming a part hereof, wherein like reference numerals refer to like parts throughout.

DESCRIPTION OF THE PREFERRED EMBODIMENTS

Figure 1:
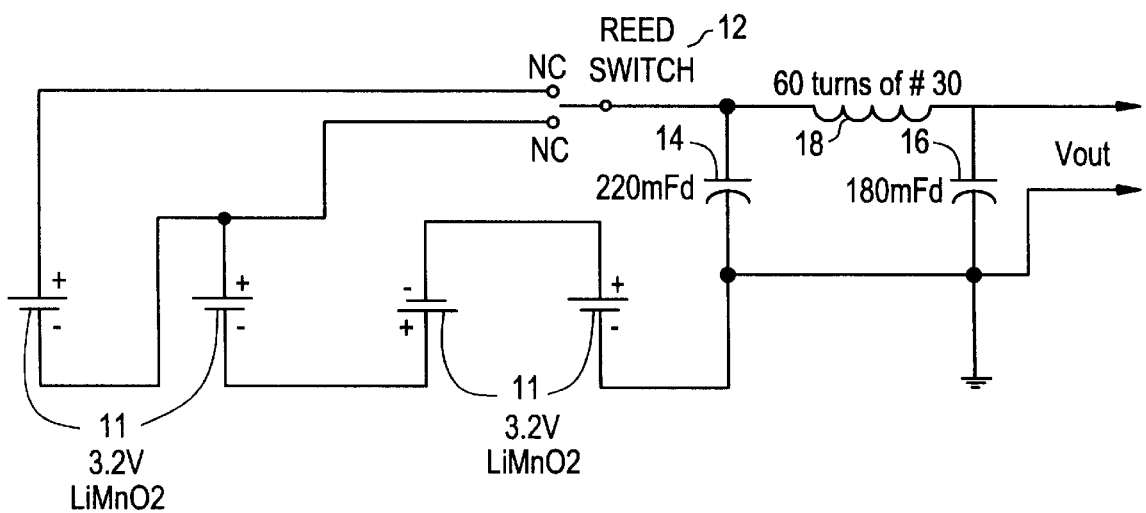
FIG. 1 is a circuit diagram of a first embodiment of an automatic battery switch circuit according to the present invention.

FIG. 1 is a circuit diagram of a first embodiment of an automatic battery power switch 10 according to the present invention. In FIG. 1, the automatic battery power switch 10 switches from n cells 11 to n+m cells 11, where n and m are any integer, in a battery under certain preset conditions. This circuit delivers a relatively constant voltage over a wide range of load current conditions. However, it is most practical to perform the switching at only one particular current setting. The circuit switch settles in less than 4 milliseconds from n cells to n+m cells. Therefore, the voltage is not higher than needed under low current conditions. Under high current conditions the voltage stays high because of the additional cells. The operation of FIG. 1 will now be explained.

The circuit in FIG. 1 uses a magnetic reed switch relay 12 which switches from n cells to n+m cells. However, any type of switch that senses current can be used. This circuit requires discrete power states that have two or more widely separated current requirements. For example, two discrete power states of 20 mA and 30 mA would not provide accurate switching. However, discrete power states of 20 mA and 400 mA would provide accurate switching. Capacitors 14 and 16 hold the voltage steady during switching. This circuit in FIG. 1 allows switching, based on current demand, to occur very rapidly, usually starting within 1 millisecond or less once high current demand commences. The current level at which switching occurs is set by the number of turns in a winding of an inductor coil 18. Once the number of turns is selected, the minimum size of the magnet wire must be selected to handle the maximum load current. A larger wire size can be used to reduce the desired overall DC resistance of the inductor coil 18 as this sets the voltage drop under high current steady state.

Figure 2:
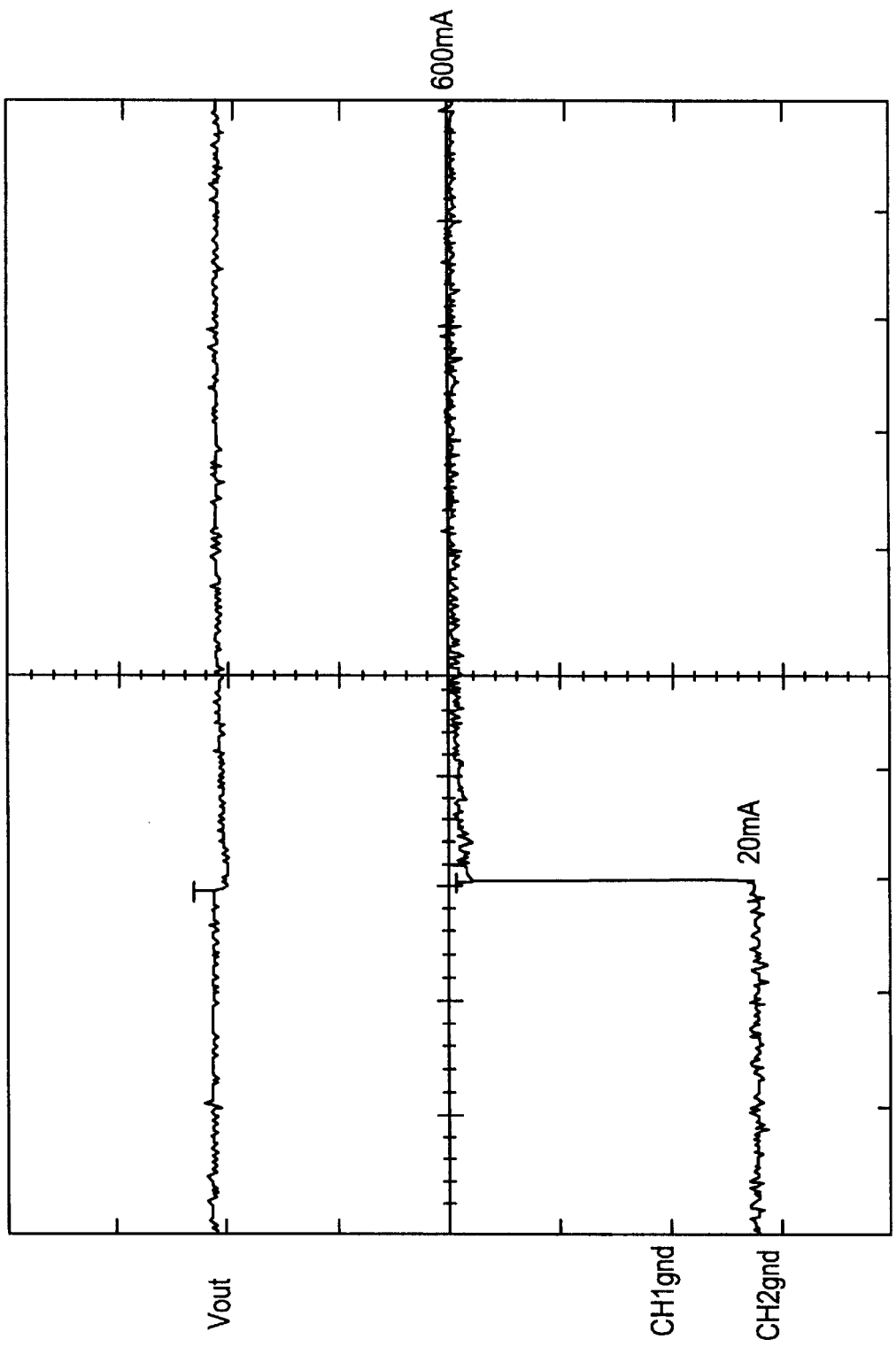
FIG. 2 is a graph of the switching characteristics of the circuit shown in FIG. 1 when the current is switched from 20 mA to 600 mA.

The capacitors 14 and 16 are required before and after the inductor coil 18 for appropriate circuit function. The capacitor 14 before the coil maintains coil current during switching. In FIG. 1, during the switching interval, no batteries are connected to the system. As can be seen in FIG. 2, this has minimal effect on the output voltage due to the capacitors. The output capacitor 16 is needed to keep any possible voltage kick from the inductor coil 18, when leaving the high current state, from reaching the output. FIG. 2 shows the switching characteristics of the cell when the current is switched from 20 mA to 600 mA. The reason that the voltage barely changes at all is that under high current, the internal impedance of the batteries present a higher internal voltage drop. In this case, that drop makes three cell and four cell voltages almost identical.

An advantage of the circuit shown in FIG. 1 is that the total quiescent current is just the leakage through the capacitors 14 and 16. Using high quality capacitors this has been measured to be below one 1 μA total for all capacitors in the circuit. In addition, the drop-out voltage is very low because the coil resistance is typically 0.3 Ω or less. Therefore, at a high level current of 600 mA, the drop-out voltage is 0.6 A×0.3 Ω=0.18 volts which is significantly less than the 1.0 to 1.2 volts for a linear voltage regulator. Table 1 below shows a comparison of various characteristics between a voltage regulator and the switch of the present invention.

TABLE 1

VOLTAGE REGULATOR VS. SWITCH

| | REGULATOR | SWITCH |
|---|---|---|
| QUIESCENT CURRENT μA | 8.2 | 0.5 |
| STEADY STATE VOLTAGE DROP at 600 mA | 1.2 | 0.18 |
| MAXIMUM TRANSIENT VOLTAGE DROP (volts) | 1.2 | 1.0 |
| TYPICAL TRANSIENT VOLTAGE DROP (volts) | 1.2 | 0.5 |
| ESTIMATED LOSS OF OPERATIONAL BATTERY LIFE | 52% | 5% |

Figure 3:
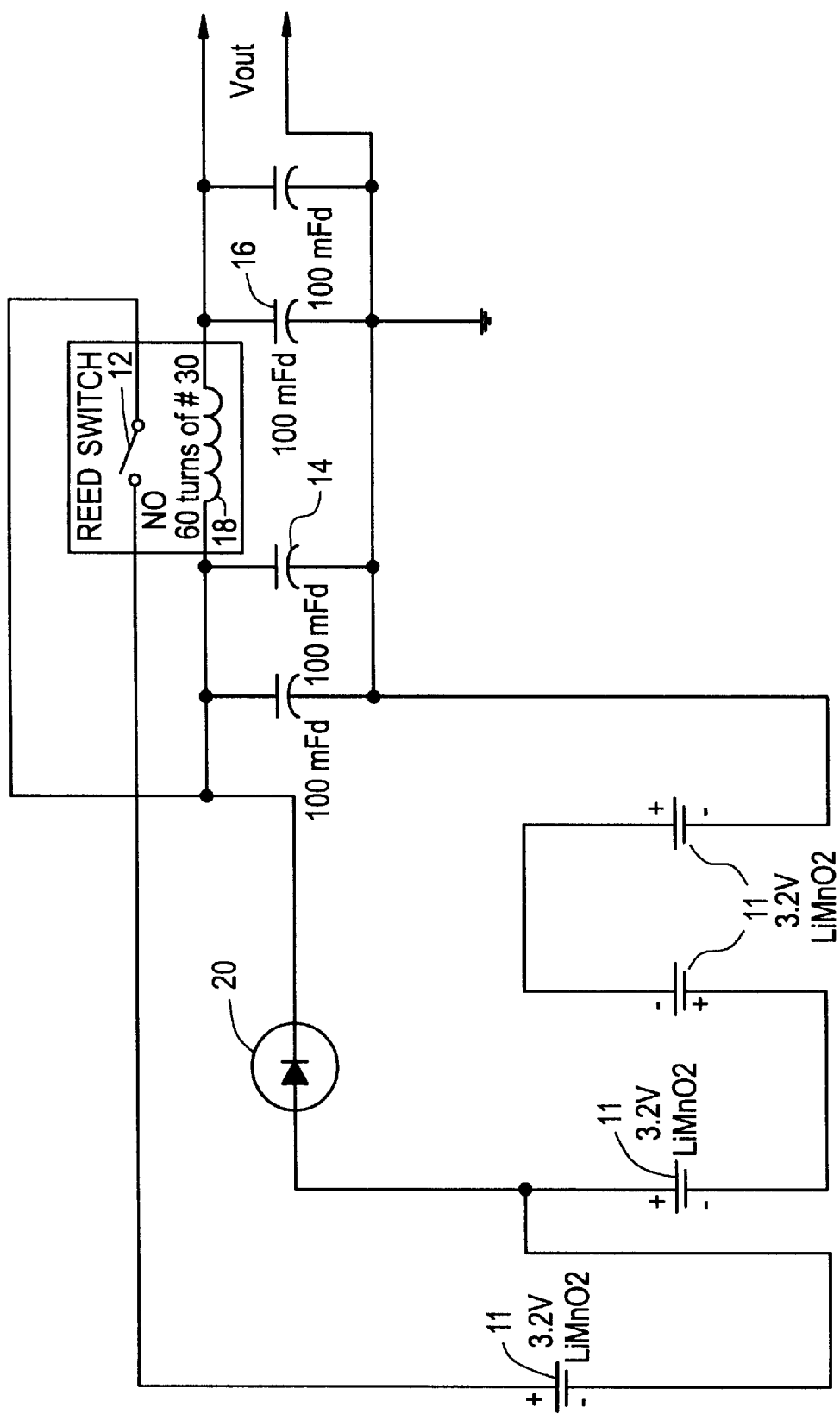
FIG. 3 is variation of the circuit diagram shown in FIG. 1.

FIG. 3 is a circuit diagram of a variation of the circuit shown in FIG. 1. A diode 20 is connected to the reed switch 12. Additional capacitors 14 and 16 are provided. The circuit in FIG. 3 provides the advantage that, unlike the circuit in FIG. 1, during the switching interval batteries are connected to the system.

Figure 4:
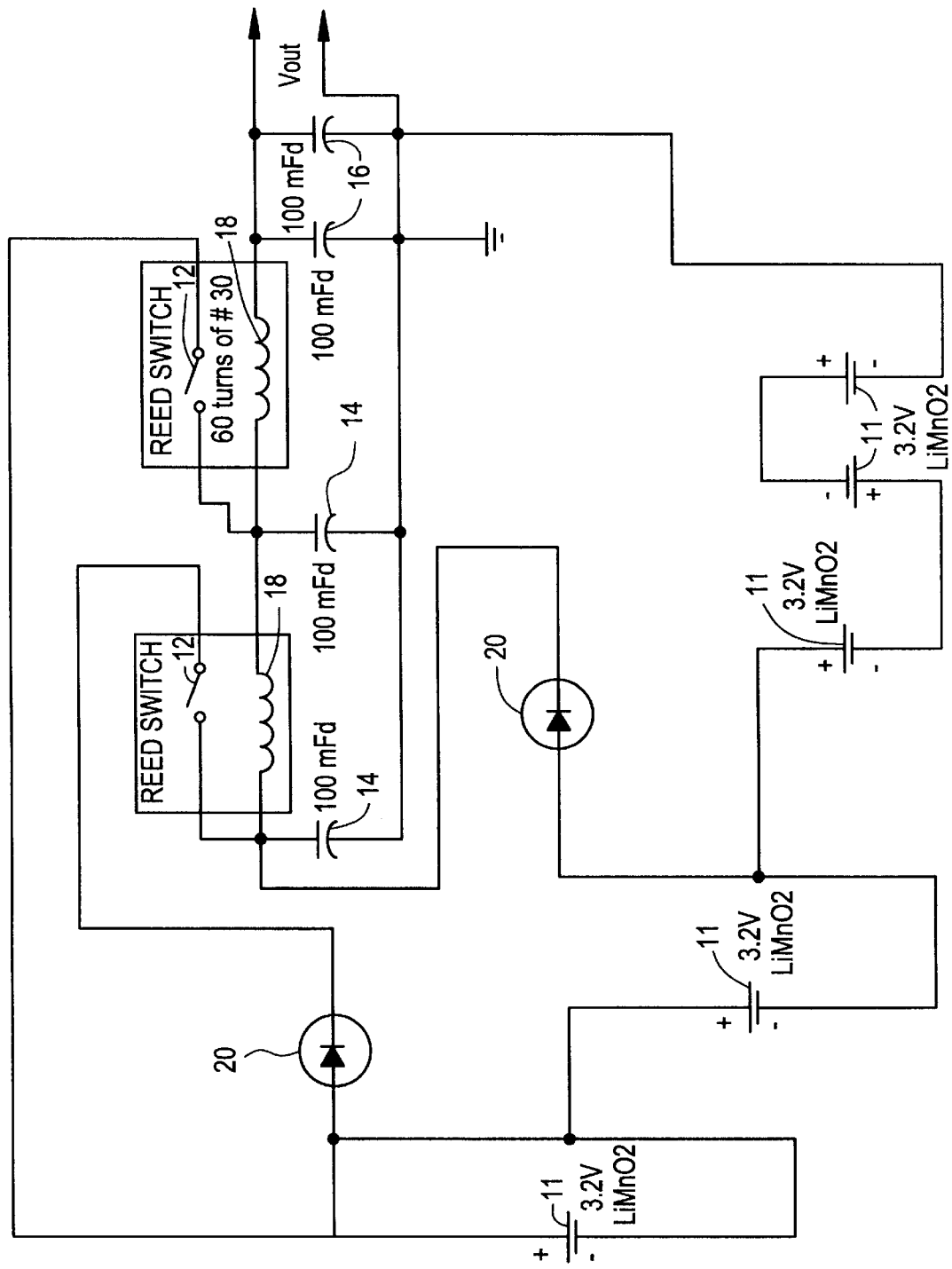
FIG. 4 is a circuit diagram of a battery switch circuit according to FIG. 3 with two thresholds.

FIG. 4 is a circuit diagram showing how a battery switch 10 having two thresholds would be configured. Multiple thresholds can be used by expanding the circuit in the manner shown.

Figure 5:
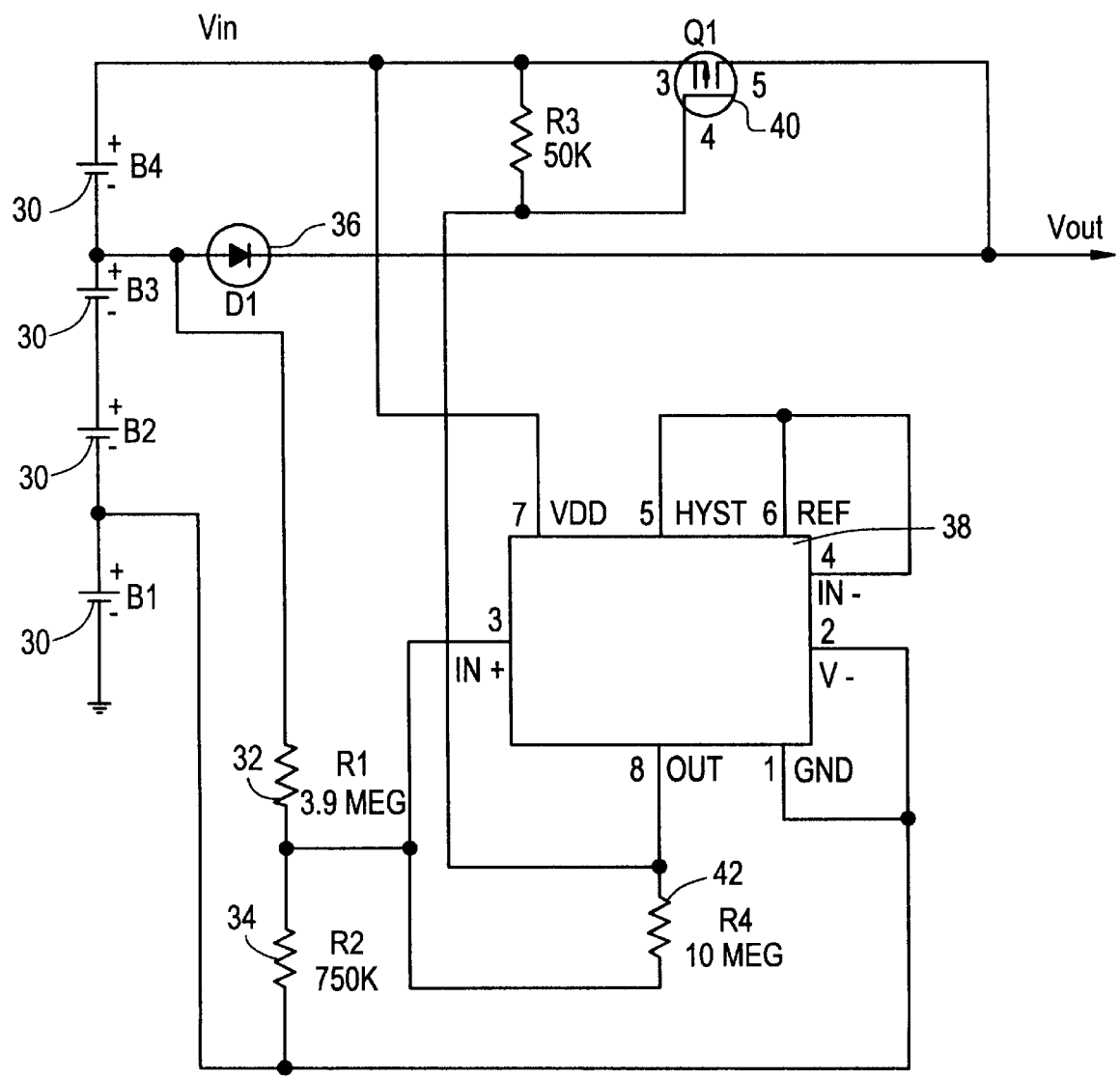
FIG. 5 is a circuit diagram of a second embodiment of an automatic battery switch circuit according to the present invention.

A second embodiment is shown in FIG. 5. FIG. 5 is a circuit which switches between n and n+m cells 11 depending on the output voltage of the circuit, thus it has a considerably higher quiescent current. This is different from the circuit in FIG. 1 which switches between cells based on load current. For example, as shown in FIG. 5, four cells 30 are shown. More or less cells 30 can be used. Each cell 30 in the circuit provides a different power. B4 powers the chip. A voltage divider includes resistors R1 32 and R2 34. Resistors R1 32 and R2 34 are picked for setting the low voltage threshold. The resistor R1 32 is connected to the anode of a diode 36 because the voltage at this point drops as a fourth cell 30 is connected under load. As the fourth cell 30 is connected, the current in the load and in all four cells 30 increases. Therefore, because of the voltage drop from the internal battery resistance, the voltage at the anode decreases, oscillation does not occur, and $V_{OUT}$ becomes high. When the voltage from cell B4 drops, a voltage comparator 38 compares the voltage between R1 32 and R2 34 to a set voltage. The output 8 OUT from the voltage comparator 38 turns ON and goes low. This turns ON FET transistor 40 which is a switch, and connects n+m cells 30 (in the case of FIG. 5, 4 cells 30). A resistor R4 42 provides the extra required hysteresis to prevent oscillation. The system was clearly observed to oscillate without this resistor present.

A higher value for R4 42 than the 10 MΩ shown, which is an example of a typical value, may be used. However, this value, with the other resistor values shown, which are also examples of typical values that can be used, was found to give a hysteresis of 4.32 volts. Hysteresis values less than or near the 3.25 open circuit cell voltage could oscillate under low current conditions. The voltage comparator 38 switches its output low when the voltage at its $V_{DD}$ pin drops below 3.8 to 4.2 volts in this example. The internal hysteresis of the voltage comparator 38 is 200 mV which is not enough to prevent oscillation in this design. The output goes low when $V_{out}$=10.73 volts with the resistor values shown. This turns ON switching transistor 40 which connects the n+m cell 30 to the output. If the battery's output voltage rises to 15.05 due to the battery warming up or the current draw dropping, then the switching transistor 40 will shut off and the voltage will drop to the n cell voltage less a diode drop. The switching transistor 40 shown in FIG. 5 can supply 12 amps continuously if properly heat sinked. The ON resistance is only 0.3 Ω so that at $I_{max}$=4 amps, the voltage drop across the switching transistor 40 will be 1.2 volts.

The circuit shown in FIG. 5 is a voltage sensing circuit that can compensate for the low temperature of batteries as well as high current loads. The circuit in FIG. 5 would not be an optimum choice for a circuit unless low temperature performance is required. In the above examples, the circuit values and configuration are given as examples. When using the present invention, the circuit values and configuration are chosen based on optimization of the switching time or optimization of the quiescent current.

Thus, the present invention provides a circuit that can be used in devices that require at least two power states, that can switch between cells in a battery at a very high speed, that can function as a voltage regulator and that can significantly prolong functional battery life. The circuit is particularly useful in all-polymer battery technology since it enables control of the battery's open circuit voltage at very low quiescent current levels. The invention is not limited to that technology however, and as mentioned above, can be used in any device that requires at least two power states, high speed switching, or low quiescent current.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

I claim:

1. An automatic battery power switch circuit, comprising:

n+m cells in a battery;

inductor means for determining the current level at which switching occurs;

a first capacitor having a first end connected between a first end of said inductor means and a second end connected to ground;

a second capacitor having a first end connected between a second end of said inductor means and a second end connected to ground; and switching means for switching between n and n+m cells based on a change in current.

2. An automatic battery power switch circuit according to claim 1, wherein said switching means is a reed switch.

3. An automatic battery power switch circuit according to claim 1, wherein said switching means comprises multiple switches.

4. An automatic battery power switch circuit according to claim 1, wherein values of said battery, said inductor means and said capacitors and their configuration are chosen to optimize the quiescent current of the automatic battery power switch.

5. An automatic battery power switch circuit according to claim 1, wherein the values of said battery, inductor means and capacitors and their configuration are chosen to minimize switching times of the automatic battery power switch.

6. An automatic battery power switch according to claim 1, further comprising a diode connected to said reed switch.

* * * * *